(12) United States Patent
Federspiel et al.

(10) Patent No.: US 8,041,482 B2
(45) Date of Patent: Oct. 18, 2011

(54) SEAT SENSOR SYSTEM

(75) Inventors: Laurent Federspiel, Canach (LU); Yves Decoster, Ethe (BE); Pierre Orlewski, Ettelbruck (PL); Laurent Lamesch, Lamadelaine (LU)

(73) Assignee: IEE International Electronics & Engineering S.A., Luxembourg (LU)

( * ) Notice: Subject to any disclaimer, the term of this patent is extended or adjusted under 35 U.S.C. 154(b) by 836 days.

(21) Appl. No.: 11/658,938

(22) PCT Filed: Jul. 8, 2005

(86) PCT No.: PCT/EP2005/053282
§ 371 (c)(1),
(2), (4) Date: Sep. 26, 2007

(87) PCT Pub. No.: WO2006/010702
PCT Pub. Date: Feb. 2, 2006

(65) Prior Publication Data
US 2008/0319616 A1    Dec. 25, 2008

(30) Foreign Application Priority Data

Jul. 29, 2004  (EP) .................................... 04103654
Aug. 4, 2004   (EP) .................................... 04103758

(51) Int. Cl.
*B60R 21/015* (2006.01)
(52) U.S. Cl. ......... 701/45; 280/735; 307/10.2; 307/10.1
(58) Field of Classification Search ............ 701/45, 701/49; 280/734, 735; 340/425.5, 426.1
See application file for complete search history.

(56) References Cited

U.S. PATENT DOCUMENTS

| 5,341,687 | A  | * | 8/1994  | Stan .......................... 73/862.046 |
| 5,871,063 | A  |   | 2/1999  | Young |
| 5,973,611 | A  | * | 10/1999 | Kulha et al. .................. 340/5.62 |
| 6,198,244 | B1 | * | 3/2001  | Hayden et al. ................ 318/466 |
| 6,323,566 | B1 | * | 11/2001 | Meier ......................... 307/10.2 |
| 6,374,938 | B2 | * | 4/2002  | Yano et al. .................... 180/268 |
| 6,397,136 | B1 | * | 5/2002  | Breed et al. .................... 701/45 |
| 6,529,124 | B2 | * | 3/2003  | Flick .......................... 340/426.1 |
| 6,584,381 | B2 | * | 6/2003  | Gehrke ............................ 701/1 |
| 6,621,411 | B2 | * | 9/2003  | McCarthy et al. ......... 340/425.5 |

FOREIGN PATENT DOCUMENTS

WO    WO 03/024749    3/2003

OTHER PUBLICATIONS

International Search Report; PCT/EP2005/053282; Oct. 4, 2005.

* cited by examiner

*Primary Examiner* — Thomas Black
*Assistant Examiner* — Marthe Marc Coleman
(74) *Attorney, Agent, or Firm* — Cantor Colburn LLP

(57) ABSTRACT

A seat sensor system including at least one seat sensor associated to a seat for sensing a status related to a seat occupancy and for generating an output signal indicative of the status and a control unit for communicating with the seat sensor. At least one transmitter for transmitting a data signal indicative of the output signal is associated with the seat and coupled to the seat sensor; and at least one receiver is coupled to the control unit for wirelessly receiving the data signal from the transmitter.

28 Claims, 2 Drawing Sheets

SEAT SENSOR SYSTEM

BACKGROUND OF INVENTION

The present invention generally relates to a seat detector e.g. for use in an automotive vehicle.

In modern vehicles, seat occupancy sensors are widely used in order to detect whether a passenger seat is occupied or not. The information about the occupancy of the passenger seat may then be used in order to control the deployment of one or more airbags associated to the vehicle seat (the deployment is e.g. inhibited if the vehicle seat is found to be non occupied).

Today's automotive safety standards require automotive vehicles to be equipped with seat belt reminder systems for reminding a vehicle passenger to fasten the seat belt associated to the occupied vehicle seat. Such seat belt reminder system comprise typically a seat occupancy sensor for detecting an occupancy of a vehicle seat and a seat belt sensor, e.g. a buckle switch sensor, for detecting whether a seat belt is fastened or not.

While until now, those seat sensors where mainly associated with the front seats of the vehicle e.g. for controlling airbag systems associated to the front seats or for generating warning signals relating to the fastening of the seat belts associated with the front seats, future standards will require that also rear seat be equipped with such seat occupancy sensors and seat belt reminder systems.

The seat occupancy sensors used in airbag control systems or seat belt reminder systems usually comprise pressure sensing devices integrated in the respective passenger seat for detecting a pressure induced by the presence of a passenger into the seat. The pressure sensing devices comprise a plurality of individual force sensors, which are connected in a suitable manner to a control unit designed for measuring a pressure depending electrical property of said individual pressure sensors. These occupancy sensors have proven to be very reliable and well adapted to the detection of seat occupancy.

The seat belt fastening detectors of seat belt reminder systems typically comprise mechanical or magnetic buckle switches for detecting, whether a latch of the seat belt is inserted into the seat belt buckle. One such buckle switch is e.g. disclosed in U.S. Pat. No. 5,871,063. As an alternative to the buckle switches, seat belt fastening detectors have been proposed which generate a buckled/unbuckled signal based on the tension in the seat belt.

One drawback of these known seat sensors lies in the fact, that the seat occupancy sensor and/or the seat belt fastening detector have to be physically connected to the control unit by means of connection wires in order to be functional. This need for physically connecting the sensing device to the control unit however causes problems especially in modern cars equipped with a flexible seating system with removable and/or displaceable back seats.

BRIEF SUMMARY OF THE INVENTION

In order to overcome the abovementioned problems, the present invention proposes a seat sensor system comprising at least one seat sensor associated to a seat for sensing a status related to a seat occupancy and for generating an output signal indicative of said status and a control unit for communicating with said at least one seat sensor. According to the invention at least one transmitter is associated with said seat, said transmitter being coupled to said at least one seat sensor, said transmitter for transmitting a data signal indicative of said output signal; and at least one receiver is coupled to said control unit, said receiver for wirelessly receiving said data signal from said transmitter.

The seat sensor system of the present invention is configured so as to enable remote communication between the seat sensor associated to the seat and the control unit for the seat sensor. The seat sensor accordingly transmits the data signal containing information regarding the seat occupancy related status wirelessly to the control unit. It follows that the seat sensor does not need to be connected to the control unit by means of connection lines. No wiring of the seat sensor being necessary, the seat sensor system does not negatively affect the advantages of the flexible seating systems of modern vehicles with removable and/or displaceable back seats. Furthermore, the present seat sensor system is well suited for use e.g. with an auxiliary child seat.

The control unit receives the data signal transmitted from the seat sensor and may further process this signal in order to e.g. generate either a warning signal (in case of a seat belt reminder system) or an airbag control signal (if the seat sensor is used for controlling the deployment of the airbag(s) associated with the seat). As the data signal from the seat sensor is remotely received, the control unit does not need to be installed into the vehicle seat but may be arranged at any suitable stationary location inside the vehicle. The control unit is accordingly not integrated into a (possibly) removable or displaceable seat so that power supply via cabling or wired connection to further components of the vehicle's electronic system is no issue. Accordingly the present seat sensor system is perfectly suited for the operation in removable vehicle seats.

In a preferred embodiment of the invention, said receiver is a multi-purpose receiver for receiving signals associated to different functions in an automotive vehicle. In this embodiment, the seat sensor system of the present invention advantageously uses a receiver module, which is already installed in the vehicle, as e.g. the receiver of the remote key entry. Such an embodiment, in which said receiver is e.g. a component of a remote key entry system of an automotive vehicle, reduces the overall costs of the system, as no additional dedicated receiver is needed.

It will be noted that the receiver of the remote key entry system is well suited for reception of signals from different locations in the vehicle. Thus the control unit may receive, via receiver of the remote key entry system, data signals transmitted both from seat sensors arranged in front vehicle seats and in rear seats. In this embodiment, seat sensor system may comprise a plurality of seat sensors associated with different seats of a vehicle, and said control unit is configured for communication with each of said plurality of seat sensors. A single common control unit reduces the complexity of the sensor system and consequently the overall costs of the system.

In a possible embodiment of the invention, a plurality of seat sensors are coupled to said at least one transmitter. This embodiment is of interest in the case of a rear seat bench, where several seat sensors associated to different seating positions are arranged in a common seat structure. These seat sensors then only require one single transmitter in order to communicate with the control unit. It will be appreciated, that this embodiment is also of interest if several seat sensors e.g. of different types, are associated with one single seat (removable or not).

In a preferred embodiment, said transmitter comprises processing means for encoding said output signal with a digital ID of said seat sensor and/or said seat and/or said transmitter into said data signal. In a multi-sensor environment, i.e. if the seat sensor system comprises a plurality of seat sensors, each individual seat sensor or each individual seat or each individual transmitter, from which a specific signal emanates, is then infallibly identifiable by the control unit so that the appropriate measures may be taken with respect to the correct seat.

In order to be able to generate and transmit a data signal to the receiver coupled to the control unit, the transmitter may be supplied by a battery module, which may be integrated into the respective seat. In a more preferred embodiment however, the transmitter may be supplied by a semi-passive power supply. Such a semi-passive power supply comprises e.g. a capacitor associated to a broadband antenna operating at the frequency of the remote key entry system and a power converting electronic circuit. Every time a RF pulse is emitted to the remote key entry system (e.g. from remote key, or from seat sensor), the antenna and the associated electronic circuit is catching the pulse and converting it into a charge stocked in the capacitor. This energy is then used to supply the transmitter.

Alternatively the transmitter is configured as a self-powered transmitter. Such self-powered transmitters are known since several years and include a device for converting a mechanical energy into electrical energy. Accordingly, the self-powered transmitter does neither rely on an external electric power supply (connected by cabling) nor on internal battery power. The self-powered transmitter is accordingly suitable for autonomous operation which eliminates the need for cabling or occasional battery replacement. This embodiment thus enables autonomous seat occupancy detection in the seat, which in addition does not require regular maintenance.

The self-powered transmitter preferably comprises a piezo generator for converting a mechanical energy into electrical energy and an electronic converter unit for generating a transmitter power supply from said electrical energy. Self-powered transmitters of this kind are known as non-powered pushbuttons for performing remote switching operations. One such pushbutton is e.g. disclosed in the article "A Compact, Wireless, Self-Powered Pushbutton Controller," Joseph A. Paradiso and Mark Feldmeier. In Abowd, G. D., Brumitt, B., and Shafer, S., eds, "Ubicomp 2001: Ubiquitous Computing," ACM UBICOMP Conference Proceedings, Atlanta Ga., September 2001, Springer-Verlag Berlin Heidelberg, 2001, pp. 299-304.

Piezo generators are known for their low weight, small size, minimal complexity and low costs. These properties make piezo generators best suitable for the integration into a vehicle environment. In the environment of an automotive vehicle, the mechanical energy to be converted into electrical energy comes from both a pressure, an occupant exerts on the piezo generator integrated in the vehicle seat, and the constant motion induced vibrations in the seat. An occupant sitting in the vehicle seat exerts indeed a varying pressure on the piezoelectric element due to vibrations caused by the vehicle movement, so that the piezo-powered generator generates the required power for the electronic unit.

Since piezoelectronics produce high voltages at low currents and standard electronic circuitry requires low voltages at high currents, an electronic converter unit is used to convert the high voltage pulses of the piezo generator into a suitable DC current for supplying the transmitter module. In a very simple embodiment, the electronic converter unit may comprise a simple diode as rectifier and/or voltage limiter.

It should be noted, that the piezo generator of the transmitter can itself act as seat sensor i.e. as a seat occupancy detector for sensing an occupancy of said seat. In fact, if the piezo generator is suitably configured so as to operate only if an occupant is actually sitting in the seat, the transmitter module will only be powered of the seat is actually occupied. This means on the other hand, that if the control unit receives a signal from the transmitter unit, the seat is necessarily occupied. In this embodiment, no further dedicated seat occupancy sensor is needed. In order to ensure a reliable detection of a seat occupancy, the piezo generator should then comprises a piezofilm associated to a seating surface of said seat and extending over a substantial part of the seating surface.

In a different embodiment, the seat occupancy detector comprises a pressure sensitive switching device comprising a plurality of individual pressure sensors or switches associated with different locations of a seat surface and/or a capacitive field detection system including at least one capacitive electrode associated with a seat surface of said seat and/or a piezoelectronics sensor associated with a seat surface of said seat.

In a further embodiment, said seat sensor comprises a seat belt fastening detector for determining a seat belt usage condition related to said seat, i.e. a seat belt buckle switch sensor and/or a temperature sensor. In the latter case, the obtained temperature signal may be used for the calibration of a seat sensor response as well as for the control of air-conditioning device of the vehicle.

BRIEF DESCRIPTION OF THE DRAWINGS

The present invention will be more apparent from the following description of several not limiting embodiments with reference to the attached drawings, wherein.

DETAILED DESCRIPTION OF THE INVENTION

Figure 1:
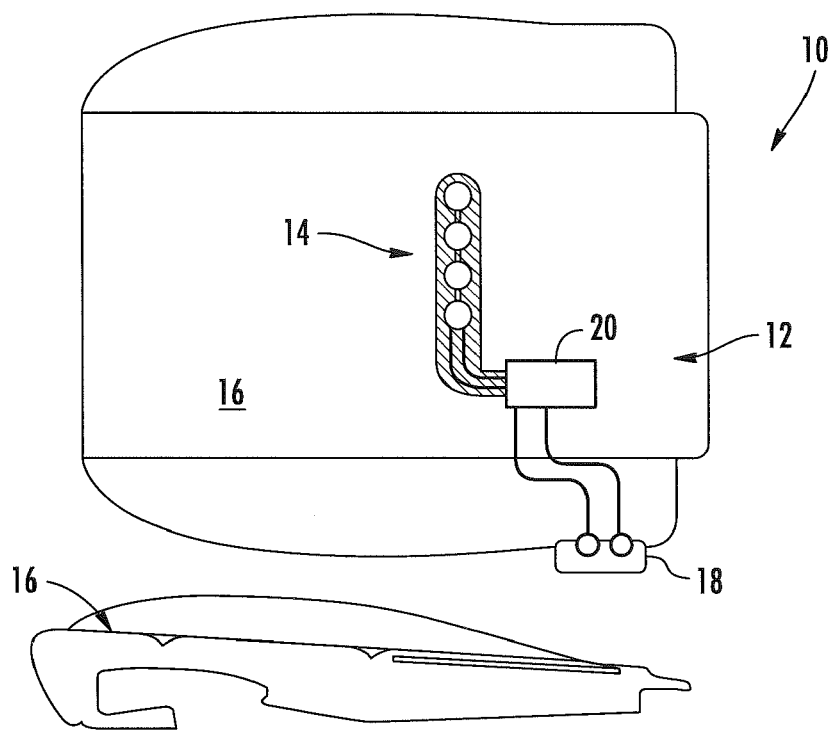
FIG. 1: shows in the a top view (upper part) and a sectional view (lower part) of a vehicle seat with seat sensor part.
Figure 2:
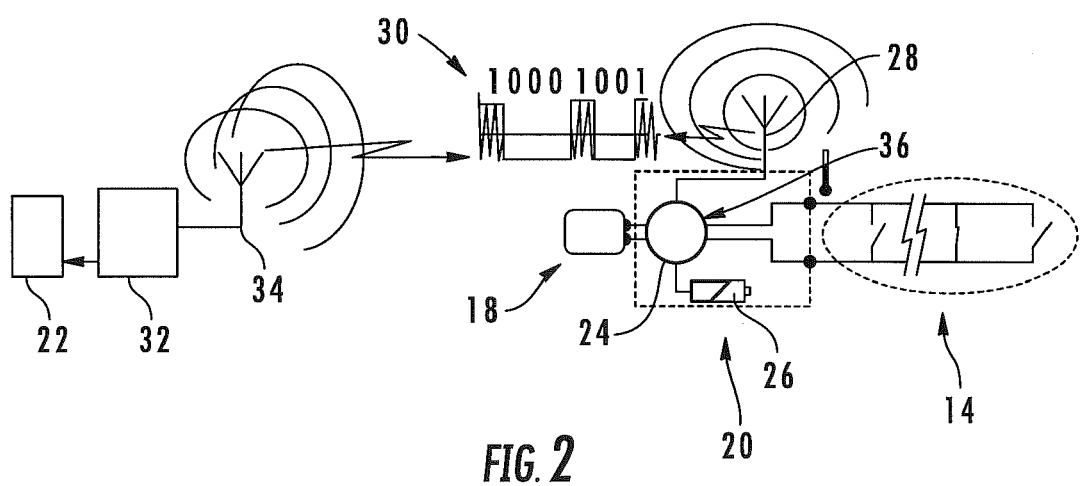
FIG. 2: shows schematically the operation of the seat sensor system of the present invention.

FIG. 1 schematically shows a top view (upper part) and a sectional view (lower part) of a vehicle seat 10 equipped with a seat sensor 12 according to one aspect of the present invention. The seat sensor 12 comprises a seat occupancy sensor 14, which is associated with a seating surface 16 of the vehicle seat 10. The seat occupancy sensor 14 comprises e.g. a foil-type pressure sensor, which is integrated into the vehicle seat in close vicinity of the upper seating surface 16 of the vehicle seat.

The seat sensor 12 represented in FIG. 1 further comprises a seat belt buckle switch sensor 18 for determining a seat belt usage condition with respect to the vehicle seat 10. This seat belt buckle switch sensor 18 e.g. detects whether a latch of the seat belt is inserted into the seat belt buckle or not.

Both the seat occupancy sensor 14 and the seat belt buckle switch sensor 18 are connected to a transmitter 20, which is able to transmit a data signal comprising information about the detected conditions to a remote control unit 22. For this reason, the transmitter 20 comprises at least one electronic circuit 24 for generating a data signal 30 containing information about the statuses of different sensors 14 and 18. The so generated data signal is then transmitted to the control unit via a sending antenna 28 connected to the transmitter 20. The sending antenna 28 may be located at any suitable location within the vehicle seat. In a possible embodiment, the antenna 28 may be printed onto a carrier layer of the seat occupancy sensor 14. Alternatively antenna 28 may be configured as miniaturized antenna, which may be integrated into a housing of the transmitter electronic circuit.

In order to be able to generate and transmit said data signal, the transmitter comprises a power supply 26, which may be integrated into the vehicle seat 10. Power supply 26 may comprise a suitable battery pack or in a more preferred embodiment a piezo generator for converting a mechanical energy into electrical energy and an electronic converter unit for generating a transmitter power supply from said electrical energy.

In order to be able to receive the transmitted data from the transmitter 20, the control unit 22 is coupled to a receiver module 32 with receiving antenna 34. In order to reduce the overall cost of the present seat sensor system, the receiver module 32 is preferably part of an existing vehicle component such as the remote key entry system of the vehicle. These remote key entry systems for remotely activating the central locking system are nowadays part of the standard vehicle equipment. The receiver module of such remote key entry system is well suited for receiving signals transmitted from every possible location within the vehicle compartment. Accordingly this receiver module may be used with the seat sensor system of the present invention. It is clear that the transmitter will be configured in this case so as to encode the data signal in a manner, which is compatible with the remote key entry system.

The control unit 20, which may be arranged at any suitable location inside the vehicle, is accordingly connected to the receiver module 32 of the remote key entry system, so that the data signal 30 received by the receiver module 32 may be supplied to the control unit 20. The control unit 20 may then further process this signal in order to e.g. generate either a warning signal (in case of a seat belt reminder system) or an airbag control signal (if the seat sensor is used for controlling the deployment of the airbag(s) associated with the seat).

In a multi-sensor environment, i.e. if the seat sensor system comprises a plurality of seat sensors 12, each individual seat sensor 12 or each individual seat 10 or each individual transmitter 20, from which a specific data signal 30 emanates should be identifiable by the control unit. In a preferred embodiment, the electronic circuit 24 of the transmitter 20 therefore preferably encodes the output signals of the sensors with a digital ID of said seat sensor and/or said seat and/or said transmitter into said data signal 30. Furthermore, the electronic circuit of the transmitter 20 is preferably able to further encode a temperature signal from a temperature sensor 36. The obtained temperature signal may be used at the controller unit 22 for the calibration of a seat sensor response as well as for the control of an air-conditioning device of the vehicle.

Figure 3:
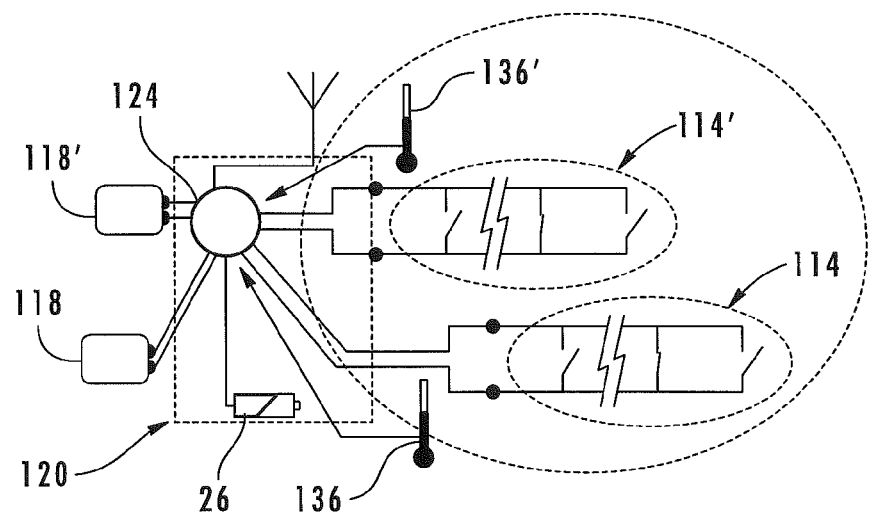
FIG. 3: illustrates an embodiment of a seat sensor system.

FIG. 3 illustrates an embodiment, wherein several seat occupancy sensors 114 and 114' as well as several buckle switch sensors 118 and 118' and temperature sensors 136 and 136' are coupled to a common transmitter 120. This embodiment may be used e.g. case of a rear seat bench, where several seat sensors associated to different seating positions are arranged in a common seat structure. In this case, the electronic circuit 124 of the transmitter 120 encodes the individual signals of the different sensors into a common data signal to be transmitted to the control unit.

Figure 4:
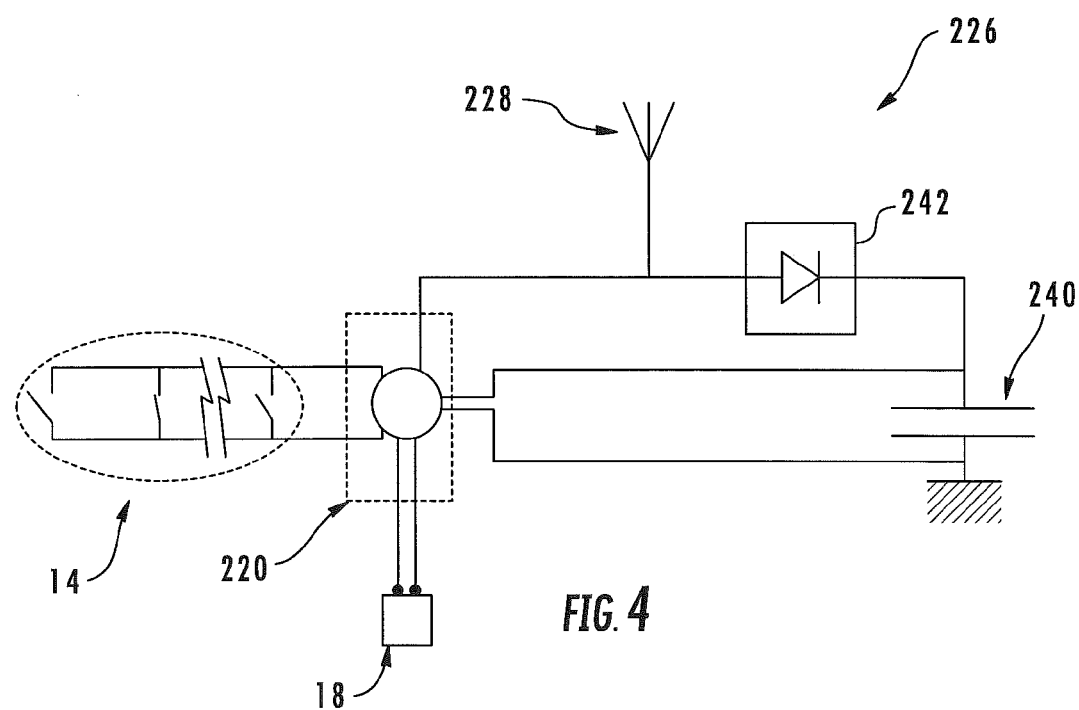
FIG. 4: illustrates an embodiment of a seat sensor system, in which the transmitter is powered by a semi-passive power supply.

FIG. 4 illustrates schematically an embodiment of the seat sensor system, in which the transmitter 220 is supplied by a semi-passive power supply 226. Such a semi-passive power supply 226 comprises a capacitor 240 associated to the broadband antenna 228 operating at the frequency of the remote key entry system and a power converting electronic circuit 242. Every time a RF pulse is emitted to the remote key entry system (e.g. from remote key, or from seat sensor), the antenna 228 and the associated electronic circuit 242 is catching the pulse and converting it into a charge stocked in the capacitor 240. This energy is then used to supply the transmitter 220.

The invention claimed is:

1. Seat sensor system comprising
at least one seat sensor associated to a seat for sensing a status related to a seat occupancy, said at least one seat sensor being configured to generate an output signal including data related to said status,
at least one transmitter associated with said seat, said transmitter being coupled to said at least one seat sensor, said transmitter being configured to receive said output signal from said at least one sensor and transmit said data related to said status via a data signal;
a control unit configured to communicate with said at least one transmitter via at least one receiver coupled to said control unit, said receiver being configured to wirelessly receive said data signal from said transmitter
wherein said receiver is a component of a remote key entry system of an automotive vehicle, thereby allowing said control unit to receive said data related to said status from said at least one sensor via said receiver of said remote key entry system.

2. Seat sensor system according to claim 1, wherein a plurality of seat sensors are coupled to said at least one transmitter.

3. Seat sensor system according to claim 1, wherein said transmitter comprises processing means configured to encode said output signal of said at least one seat sensor with a digital ID of said seat sensor and/or said seat and/or said transmitter into said data signal.

4. Seat sensor system according to claim 1, wherein said transmitter comprises a semi-passive power supply including a capacitor associated to a broadband antenna operating at the frequency of the remote key entry system and a power converting electronic circuit for converting a radio frequency signal received by said antenna into a charging voltage for said capacitor.

5. Seat sensor system according to claim 1, wherein said transmitter comprises a piezo generator for converting a mechanical energy into electrical energy and an electronic converter unit for generating a transmitter power supply from said electrical energy.

6. Seat sensor system according to claim 5, wherein said piezo generator comprises a piezofilm associated to a seating surface of said seat.

7. Seat sensor system according to claim 1, wherein said seat sensor comprises a seat occupancy detector for sensing an occupancy of said seat.

8. Seat sensor system according to claim 7, wherein said seat occupancy detector comprises a pressure sensitive switching device comprising a plurality of individual pressure sensors or switches associated with different locations of a seat surface.

9. Seat sensor system according to claim 7, wherein said seat occupancy detector comprises a capacitive field detection system including at least one capacitive electrode associated with a seat surface of said seat.

10. Seat sensor system according to claim 7, wherein said seat occupancy detector comprises a piezoelectronics sensor associated with a seat surface of said seat.

11. Seat sensor system according to claim 1, wherein said seat sensor comprises a seat belt fastening detector for determining a seat belt usage condition related to said seat.

12. Seat sensor system according to claim 11, wherein said seat belt fastening detector comprises a seat belt buckle switch sensor.

13. Seat sensor system according to claim 1, wherein said seat sensor comprises a temperature sensor.

14. Automotive vehicle comprising
a remote key entry system including at least one receiver;
at least one vehicle seat; and
a seat sensor system associated to said at least one vehicle seat,
said seat sensor system comprising
at least one seat sensor associated to said vehicle seat, said at least one seat sensor being configured to sense a status related to a seat occupancy and generate an output signal including data related to said status,
at least one transmitter, said transmitter being coupled to said at least one seat sensor, said transmitter being configured to receive said output signal from said at least one sensor and transmit said data related to said status via a data signal;
a control unit configured to wirelessly communicate with said at least one transmitter and wirelessly receive said data signal from said transmitter via said at least one receiver of said remote key entry system, thereby allowing said control unit to receive said data related to said status from said at least one sensor via said receiver of said remote key entry system.

15. Automotive vehicle according to claim 14, wherein said seat sensor system comprises a plurality of seat sensors coupled to said at least one transmitter.

16. Automotive vehicle according to claim 14, wherein said transmitter comprises processing means configured to encode said output signal of said at least one seat sensor with a digital ID of said seat sensor and/or said seat and/or said transmitter into said data signal.

17. Automotive vehicle according to claim 14, wherein said transmitter comprises a semi-passive power supply including a capacitor associated to a broadband antenna operating at the frequency of the remote key entry system and a power converting electronic circuit for converting a radio frequency signal received by said antenna into a charging voltage for said capacitor.

18. Automotive vehicle according to claim 14, wherein said transmitter comprises a piezo generator for converting a mechanical energy into electrical energy and an electronic converter unit for generating a transmitter power supply from said electrical energy.

19. Automotive vehicle according to claim 18, wherein said piezo generator comprises a piezofilm associated to a seating surface of said seat.

20. Automotive vehicle according to claim 14, wherein said seat sensor comprises a seat occupancy detector for sensing an occupancy of said seat.

21. Automotive vehicle according to claim 20, wherein said seat occupancy detector comprises a pressure sensitive switching device comprising a plurality of individual pressure sensors or switches associated with different locations of a seat surface.

22. Automotive vehicle according to claim 20, wherein said seat occupancy detector comprises a capacitive field detection system including at least one capacitive electrode associated with a seat surface of said seat.

23. Automotive vehicle according to claim 20, wherein said seat occupancy detector comprises a piezoelectronics sensor associated with a seat surface of said seat.

24. Automotive vehicle according to claim 14, wherein said seat sensor comprises a seat belt fastening detector for determining a seat belt usage condition related to said seat.

25. Seat sensor system according to claim 24, wherein said seat belt fastening detector comprises a seat belt buckle switch sensor.

26. Automotive vehicle according to claim 14, wherein said seat sensor comprises a temperature sensor.

27. Seat sensor system comprising
at least a first seat sensor and a second seat sensor associated to a seat for respectively sensing a first status related to seat occupancy and a second status related to seat occupancy, said first seat sensor being configured to generate a first output signal including a first data set related to said first status, and said second seat sensor being configured to generate a second output signal including a second data set related to said second status, said first status indicating a different seat occupancy condition from said second seat status;
at least one transmitter associated with said seat, said transmitter being coupled to said first and said second seat sensors, said transmitter being configured to receive said first and said second output signals from said first and said second sensors, and transmit said first and said second data sets via a data signal;
a control unit configured to communicate with said at least one transmitter via at least one receiver coupled to said control unit, said receiver being configured to wirelessly receive said data signal from said transmitter
wherein said receiver is a component of a remote key entry system of an automotive vehicle, thereby allowing said control unit to receive said data related to said status from said at least one sensor via said receiver of said remote key entry system.

28. Automotive vehicle comprising
a remote key entry system including at least one receiver;
at least one vehicle seat; and
a seat sensor system associated to said at least one vehicle seat,
said seat sensor system comprising
at least a first seat sensor and a second seat sensor associated to a seat for respectively sensing a first status related to seat occupancy and a second status related to seat occupancy, said first seat sensor being configured to generate a first output signal including a first data set related to said first status, and said second seat sensor being configured to generate a second output signal including a second data set related to said second status, said first status indicating a seat different occupancy condition from said second seat status;
at least one transmitter associated with said seat, said transmitter being coupled to said first and said second seat sensors, said transmitter being configured to receive said first and said second output signals from said first and said second sensors, and transmit said first and said second data sets via a data signal;
a control unit configured to wirelessly communicate with said at least one transmitter and wirelessly receive said data signal from said transmitter via said at least one receiver of said remote key entry system, thereby allowing said control unit to receive said data related to said status from said at least one sensor via said receiver of said remote key entry system.

* * * * *